(12) United States Patent
Wang

(10) Patent No.: US 11,412,172 B2
(45) Date of Patent: Aug. 9, 2022

(54) VIDEO RECORDING METHOD AND DEVICE, INTERNET PROTOCOL CAMERA AND STORAGE MEDIUM

(71) Applicant: GOERTEK INC., Weifang (CN)

(72) Inventor: Ming Wang, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 17/395,707

(22) Filed: Aug. 6, 2021

(65) Prior Publication Data
US 2021/0368130 A1    Nov. 25, 2021

Related U.S. Application Data

(63) Continuation of application No. PCT/CN2019/109272, filed on Sep. 30, 2019.

(30) Foreign Application Priority Data

Mar. 26, 2019 (CN) .......................... 201910235885.6

(51) Int. Cl.
    *H04N 5/77* (2006.01)
    *G11B 27/10* (2006.01)

(52) U.S. Cl.
    CPC ............. *H04N 5/77* (2013.01); *G11B 27/10* (2013.01)

(58) Field of Classification Search
    CPC .................................. H04N 5/77; G11B 27/10
    See application file for complete search history.

(56) References Cited

U.S. PATENT DOCUMENTS

| 2013/0173819 A1 | 7/2013 | Lee et al. |
| 2014/0104493 A1* | 4/2014 | Liu ............. H04N 19/132 |
| | | 348/E7.003 |
| 2017/0353770 A1 | 12/2017 | Jiang et al. |
| 2020/0099854 A1* | 3/2020 | Kajiwara ........... H04N 19/172 |

FOREIGN PATENT DOCUMENTS

| CN | 101540840 A | 9/2009 |
| CN | 103686042 A | 3/2014 |
| CN | 104620595 A | 5/2015 |
| CN | 107197394 A | 9/2017 |
| CN | 107392983 A | 11/2017 |
| CN | 108259805 A | 7/2018 |

(Continued)

OTHER PUBLICATIONS

International Search Report and Written Opinion issued in corresponding International Application No. PCT/CN2019/109272; dated Dec. 27, 2019, 14 pgs.

(Continued)

*Primary Examiner* — Thai Q Tran
*Assistant Examiner* — Jose M Mesa
(74) *Attorney, Agent, or Firm* — Hauptman Ham, LLP

(57) ABSTRACT

Disclosed are a video recording method, a video recording device, an Internet Protocol camera and a storage medium. In this disclosure, a relative timestamp of a current image uploaded by an image sensor is compared with a recording timestamp of a current recording frame, then an image to be recorded corresponding to the current recording frame is determined according to a comparison result, and finally video recording is performed according to the image to be recorded.

15 Claims, 2 Drawing Sheets

(56) References Cited

FOREIGN PATENT DOCUMENTS

| | | | |
|---|---|---|---|
| CN | 108449634 | A | 8/2018 |
| CN | 108737874 | A | 11/2018 |
| CN | 109348281 | A | 2/2019 |
| CN | 109788224 | A | 5/2019 |
| EP | 1441517 | A1 | 7/2004 |

OTHER PUBLICATIONS

First Office Action issued in corresponding Chinese Application No. 201910235885.6; dated Feb. 27, 2020; State Intellectual Property Office of the P.R. China, Beijing, China, 16 pgs.

Second Office Action issued in corresponding Chinese Application No. 201910235885.6; dated Aug. 17, 2020; State Intellectual Property Office of the P.R. China, Beijing, China, 13 pgs.

* cited by examiner

VIDEO RECORDING METHOD AND DEVICE, INTERNET PROTOCOL CAMERA AND STORAGE MEDIUM

CROSS REFERENCE TO RELATED APPLICATIONS

This disclosure is a Continuation Application of International Application No. PCT/CN2019/109272, filed on Sep. 30, 2019, which claims the priority to Chinese Patent Application No. 201910235885.6, entitled "VIDEO RECORDING METHOD AND DEVICE, INTERNET PROTOCOL CAMERA AND STORAGE MEDIUM", submitted to the China National Intellectual Property Administration on Mar. 26, 2019, which is hereby incorporated by reference in its entirety.

TECHNICAL FIELD

This disclosure relates to the technical field of data processing, in particular to a video recording method, a video recording device, an Internet Protocol camera and a storage medium.

BACKGROUND

The main function of the Internet Protocol Camera (IP Camera) is to monitor the scene in real time. The real-time image is acquired through the image sensor of the Internet Protocol camera, and the application in the control terminal of the Internet Protocol camera can broadcast the scene in real time or record the video and upload it to the server. For some Internet Protocol cameras with complex functions, in addition to acquiring images, it is also necessary to analyze the contents of the images, such as acquiring moving objects in the current scene or detected actions.

The analysis process is generally time-consuming, resulting in uneven time for the image sensor to report the image to the control terminal. At the same time, in the process of long-term operation, due to the instability of the system or the long time of the analysis process, the backlog of images reported by the image sensor will cause the problem of frame loss. In the related art, the control terminal will directly perform video recording according to the image reported by the image sensor. As a result, when the control terminal performs video recording according to the images reported by the image sensor, the frame rate of the video is unstable and the smoothness of video playback cannot be guaranteed.

The above content is only used to assist the understanding of the technical solution of this disclosure, and does not mean that the above content is recognized as the prior art.

SUMMARY

The main object of this disclosure is to provide a video recording method, a video recording device, an Internet Protocol camera and a storage medium, aiming to solve the technical problem in the related art that video recording is directly performed according to the image reported by the image sensor, resulting in unstable frame rate of the recorded video, and the smoothness of video playback cannot be guaranteed.

To achieve the above object, this disclosure provides a video recording method, including the following steps:

comparing a relative timestamp of a current image uploaded by an image sensor with a recording timestamp of a current recording frame;

determining an image to be recorded corresponding to the current recording frame according to a comparison result; and performing video recording according to the image to be recorded.

In an embodiment, the step of determining an image to be recorded corresponding to the current recording frame according to a comparison result includes:

in a determination that the comparison result is that the relative timestamp is greater than the recording timestamp, calculating a current time difference between the relative timestamp of the current image and the recording timestamp of the current recording frame, and determining the image to be recorded corresponding to the current recording frame according to the current time difference;

in a determination that the comparison result is that the relative timestamp is less than the recording timestamp, returning to the step of comparing a relative timestamp of a current image uploaded by an image sensor with a recording timestamp of a current recording frame; and in a determination that the comparison result is that the relative timestamp is equal to the recording timestamp, taking the current image as the image to be recorded corresponding to the current recording frame.

In an embodiment, the step of determining the image to be recorded corresponding to the current recording frame according to the current time difference includes:

in a determination that the current time difference is less than a preset time difference, taking the current image as the image to be recorded corresponding to the current recording frame, where the preset time difference is a time difference between the recording timestamp and a relative timestamp stored in a preset area;

in a determination that the current time difference is greater than the preset time difference, taking an image in the preset area as the image to be recorded corresponding to the current recording frame; and in a determination that the current time difference is equal to the preset time difference, taking the image in the preset area or the current image as the image to be recorded corresponding to the current recording frame.

In an embodiment, where:

the step of in a determination that the comparison result is that the relative timestamp is less than the recording timestamp, returning to the step of comparing a relative timestamp of a current image uploaded by an image sensor with a recording timestamp of a current recording frame includes:

in a determination that the comparison result is that the relative timestamp is less than the recording timestamp, updating data for the preset area according to the current image and the relative timestamp of the current image, returning to the step of comparing a relative timestamp of a current image uploaded by an image sensor with a recording timestamp of a current recording frame;

the step of in a determination that the comparison result is that the relative timestamp is equal to the recording timestamp, taking the current image as the image to be recorded corresponding to the current recording frame includes:

in a determination that the comparison result is that the relative timestamp is equal to the recording timestamp, taking the current image as the image to be recorded corresponding to the current recording frame, and updating data for the preset area according to the current image and the relative timestamp of the current image; and the step of in a determination that the current time difference is less than a preset time difference, taking the current image as the image to be recorded corresponding to the current recording frame includes:

in a determination that the current time difference is less than the preset time difference, taking the current image as the image to be recorded corresponding to the current recording frame, and updating data for the preset area according to the current image and the relative timestamp of the current image.

In an embodiment, before the step of comparing a relative timestamp of a current image uploaded by an image sensor with a recording timestamp of a current recording frame, the video recording method further includes:

determining a recording timestamp of each frame to be recorded according to a preset frame rate; and taking a frame to be recorded with the smallest recording timestamp as the current recording frame;

where the step of performing video recording according to the image to be recorded includes:

adding the image to be recorded to a video packaging assembly, deleting the recording timestamp of the current recording frame, and returning to the step of taking a frame to be recorded with the smallest recording timestamp as the current recording frame.

In an embodiment, before the step of comparing a relative timestamp of a current image uploaded by an image sensor with a recording timestamp of a current recording frame, the video recording method further includes:

upon receiving a timestamp of the current image uploaded by the image sensor, converting the timestamp of the current image to the relative timestamp according to a reference timestamp.

In an embodiment, before the step of upon receiving a timestamp of the current image uploaded by the image sensor, converting the timestamp of the current image to the relative timestamp according to a reference timestamp, the video recording method further includes:

upon receiving a video recording instruction, taking a timestamp of a first image uploaded by the image sensor as the reference timestamp.

Further, in order to achieve the above object, this disclosure further provides a video recording device, which includes:

a timestamp comparison module configured for comparing a relative timestamp of a current image uploaded by an image sensor with a recording timestamp of a current recording frame;

an image determination module configured for determining an image to be recorded corresponding to the current recording frame according to a comparison result; and a video recording module configured for performing video recording according to the image to be recorded.

Further, in order to achieve the above object, this disclosure further provides an Internet Protocol camera, which includes: a memory, a processor, and a video recording program stored on the memory and executable on the processor, where the video recording program is executed by the processor to implement the steps of the video recording method described above.

Further, to achieve the above object, this disclosure further provides a storage medium, where a video recording program is stored on the storage medium, and the video recording program is executed by the processor to implement the steps of the video recording method described above.

In this disclosure, a relative timestamp of a current image uploaded by an image sensor is compared with a recording timestamp of a current recording frame, then an image to be recorded corresponding to the current recording frame is determined according to a comparison result, and finally video recording is performed according to the image to be recorded. As can be seen, according to the technical solution of this disclosure, video recording will not be performed directly according to the image reported by the image sensor. The image to be recorded corresponding to the current recording frame is determined according to the comparison result between the relative timestamp of the current image uploaded by the image sensor and the recording timestamp of the current recording frame, and then video recording is performed according to the image to be recorded. As a result, the relative timestamp of the image to be recorded can be made closer to the recording timestamp of the current recording frame, so that the frame rate of the recorded video is stable, and the smoothness of video playback is ensured.

BRIEF DESCRIPTION OF THE DRAWINGS

In order to more clearly explain the embodiments of this disclosure or the technical solutions in the related art, the drawings used in the description of the embodiments or the related art will be briefly introduced below. Obviously, the drawings in the following description are merely part of the drawings of this disclosure. For those of ordinary skill in the art, other drawings can be obtained based on these drawings without paying creative work.

The realization of the object, functional characteristics, and advantages of this disclosure will be further described in connection with the embodiments and with reference to the accompanying drawings.

DETAILED DESCRIPTION OF THE EMBODIMENTS

In the following, the technical solutions in the embodiments of this disclosure will be described in connection with the drawings in the embodiments of this disclosure, obviously, the described embodiments are only a part of the embodiments of this disclosure, and not all of the embodiments. Based on the embodiments of this disclosure, all other embodiments obtained by those of ordinary skill in the art without creative efforts shall fall within the claimed scope of this disclosure.

Figure 1:
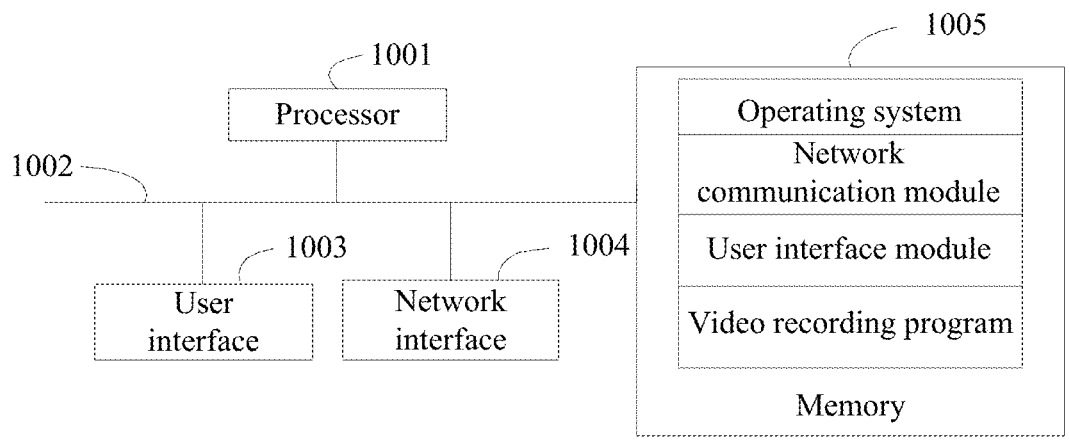
FIG. 1 is a schematic structural diagram of an Internet Protocol camera of a hardware operating environment involved in an embodiment of this disclosure.

As shown in FIG. 1, an Internet Protocol camera may include a processor 1001, such as a CPU, a communication bus 1002, a user interface 1003, a network interface 1004, and a memory 1005. The communication bus 1002 is configured to implement connection and communication among these components. The user interface 1003 may include a display, and optionally the user interface 1003 may further include a standard wired interface and a wireless interface. The network interface 1004 may optionally include a standard wired interface and a wireless interface (such as a WI-FI interface). The memory 1005 may be a high-speed RAM memory or a stable memory (non-volatile memory), such as a disk memory. Optionally, the memory 1005 may be a storage server independent of the foregoing processor 1001.

Those skilled in the art may understand that the structure shown in FIG. 1 does not constitute a limitation on the Internet Protocol camera, and more or less components than those illustrated may be included, or certain components may be combined, or different components may be arranged.

As shown in FIG. 1, the memory 1005 as a computer storage medium may include an operating system, a network communication module, a user interface module, and a video recording program.

The Internet Protocol camera calls the video recording program stored on the memory 1005 through the processor 1001 and performs the following operations:

comparing a relative timestamp of a current image uploaded by an image sensor with a recording timestamp of a current recording frame;

determining an image to be recorded corresponding to the current recording frame according to a comparison result; and performing video recording according to the image to be recorded.

Further, the processor 1001 may call the video recording program stored on the memory 1005 and further performs the following operations:

in a determination that the comparison result is that the relative timestamp is greater than the recording timestamp, calculating a current time difference between the relative timestamp of the current image and the recording timestamp of the current recording frame, and determining the image to be recorded corresponding to the current recording frame according to the current time difference;

in a determination that the comparison result is that the relative timestamp is less than the recording timestamp, returning to the step of comparing a relative timestamp of a current image uploaded by an image sensor with a recording timestamp of a current recording frame; and in a determination that the comparison result is that the relative timestamp is equal to the recording timestamp, taking the current image as the image to be recorded corresponding to the current recording frame.

Further, the processor 1001 may call the video recording program stored on the memory 1005 and further performs the following operations:

in a determination that the current time difference is less than a preset time difference, taking the current image as the image to be recorded corresponding to the current recording frame, where the preset time difference is a time difference between the recording timestamp and a relative timestamp stored in a preset area;

in a determination that the current time difference is greater than the preset time difference, taking an image in the preset area as the image to be recorded corresponding to the current recording frame; and in a determination that the current time difference is equal to the preset time difference, taking the image in the preset area or the current image as the image to be recorded corresponding to the current recording frame.

Further, the processor 1001 may call the video recording program stored on the memory 1005 and further performs the following operations:

in a determination that the comparison result is that the relative timestamp is less than the recording timestamp, updating data for the preset area according to the current image and the relative timestamp of the current image, returning to the step of comparing a relative timestamp of a current image uploaded by an image sensor with a recording timestamp of a current recording frame;

in a determination that the comparison result is that the relative timestamp is equal to the recording timestamp, taking the current image as the image to be recorded corresponding to the current recording frame, and updating data for the preset area according to the current image and the relative timestamp of the current image; and in a determination that the comparison result is that the current time difference is less than the preset time difference, taking the current image as the image to be recorded corresponding to the current recording frame, and updating data for the preset area according to the current image and the relative timestamp of the current image.

Further, the processor 1001 may call the video recording program stored on the memory 1005 and further performs the following operations:

determining a recording timestamp of each frame to be recorded according to a preset frame rate; and taking a frame to be recorded with the smallest recording timestamp as the current recording frame; and adding the image to be recorded to a video packaging assembly, deleting the recording timestamp of the current recording frame, and returning to the step of taking a frame to be recorded with the smallest recording timestamp as the current recording frame.

Further, the processor 1001 may call the video recording program stored on the memory 1005 and further performs the following operations:

upon receiving a timestamp of the current image uploaded by the image sensor, converting the timestamp of the current image to the relative timestamp according to a reference timestamp.

Further, the processor 1001 may call the video recording program stored on the memory 1005 and further performs the following operations:

upon receiving a video recording instruction, taking a timestamp of a first image uploaded by the image sensor as the reference timestamp.

In this embodiment, a relative timestamp of a current image uploaded by an image sensor is compared with a recording timestamp of a current recording frame, then an image to be recorded corresponding to the current recording frame is determined according to a comparison result, and finally video recording is performed according to the image to be recorded. As can be seen, according to the technical solution of this disclosure, video recording will not be performed directly according to the image reported by the image sensor. The image to be recorded corresponding to the current recording frame is determined according to the comparison result between the relative timestamp of the current image uploaded by the image sensor and the recording timestamp of the current recording frame, and then video recording is performed according to the image to be recorded. As a result, the relative timestamp of the image to be recorded can be made closer to the recording timestamp of the current recording frame, so that the frame rate of the recorded video is stable, and the smoothness of video playback is ensured.

Based on the above hardware structure, some embodiments of the video recording method of this disclosure are provided.

Figure 2:
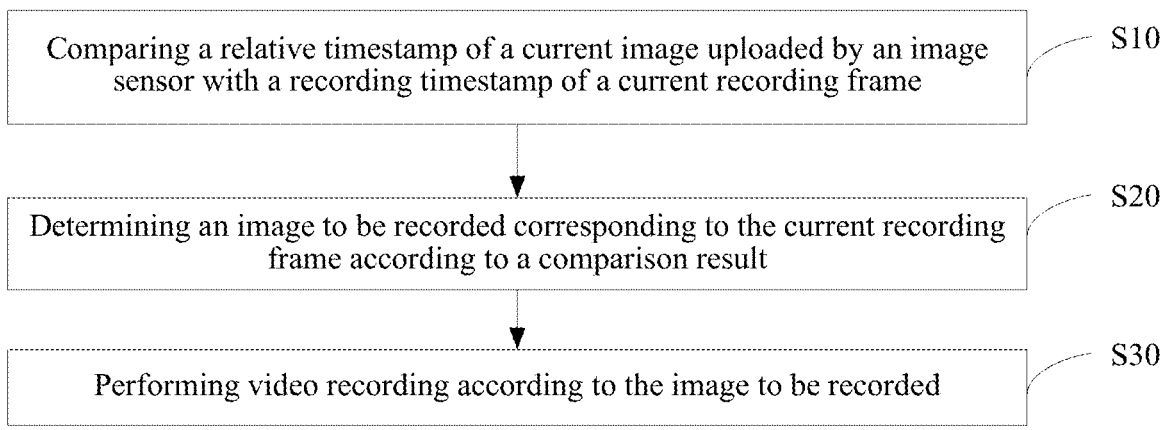
FIG. 2 is a flow chart of a first embodiment of a video recording method according to this disclosure.

Referring to FIG. 2, FIG. 2 is a flow chart of a first embodiment of a video recording method according to this disclosure.

In the first embodiment, the video recording method includes the following steps:

S10. Comparing a relative timestamp of a current image uploaded by an image sensor with a recording timestamp of a current recording frame.

It should be understood that, for the image sensor, timestamp will be acquired at the same time of image acquisition, for example: the time of image acquisition is 12:11:34, at this time, the timestamp of image acquisition can be set to 12:11:34.

It can be understood that the current image is an image uploaded by the image sensor at the current time. Since the timestamp of the current image is usually an objective information, it cannot reflect the relationship with the recorded frame, upon receiving a timestamp of the current image uploaded by the image sensor, the timestamp of the current image is converted to the relative timestamp according to a reference timestamp.

In the specific implementation, the relative timestamp is a time parameter relative to the reference timestamp, assuming that the timestamp of the current image is 12:11:34, the reference timestamp is 12:11:32, at this time, the relative timestamp of the current image is 2 seconds.

In order to ensure that the reference timestamp has reference value, in this embodiment, upon receiving the timestamp of the current image uploaded by the image sensor and before converting the timestamp of the current image into a relative timestamp according to the reference timestamp, a timestamp of a first image uploaded by the image sensor may be taken as the reference timestamp after receiving the video recording instruction, that is, assuming that the video recording instruction is received at 12:11:29, and the image sensor uploads the first image at 12:11:32 after 12:11:29, at this time, 12:11:32 can be taken as the reference timestamp.

In the specific implementation, the video recording instruction can be triggered by the user, that is, the user can trigger recording through a human-computer interaction component such as a touch screen and a button to generate the video recording instruction. Certainly, the video recording instruction can also be generated by the Internet Protocol camera itself. In other words, the Internet Protocol camera generally has the function of recognizing the image detected by the image sensor, such as: character recognition, therefore, the Internet Protocol camera can realize the character intrusion detection by itself, and generate a video recording instruction when the character intrusion is detected. Certainly, some Internet Protocol cameras that do not have the function of character recognition can also send the acquired image to other devices with character recognition function for recognition, receive the detection result fed back by other devices, and generate a video recording instruction when the character intrusion is detected.

It should be noted that, the current recording frame is a current frame image required for video recording. In order to facilitate determining the current recording frame, in this embodiment, a recording timestamp of each frame to be recorded may be determined according to a preset frame rate, and then a frame to be recorded with a minimum recording timestamp may be taken as the current recording frame.

In a specific implementation, the preset frame rate can be set by the user, that is, the user can set the frame rate through a human-computer interaction component such as a touch screen or a button, and the set frame rate is taken as the preset frame rate. Certainly, the preset frame rate may be a default frame rate of the Internet Protocol camera or may be set in other ways, which is not limited in this embodiment.

Generally speaking, after the preset frame rate is determined, the recording timestamp of each frame to be recorded can be determined according to the preset frame rate. Assuming that the preset frame rate is 30, a time interval between two adjacent frames in the recorded video is 33.33 ms, and the recorded video has 30 frames per second. Generally speaking, recording starts from an initial frame with the recording timestamp of 0, however, since the initial frame usually corresponds to the first frame image (that is, the image corresponding to the reference timestamp), the frame to be recorded is another frame except the initial frame, so the recording timestamp of the "framecount"-th frame to be recorded is 33.33*framecount (the unit of timestamp is ms).

S20. Determining an image to be recorded corresponding to the current recording frame according to a comparison result.

It should be noted that there may be various possible comparison results when comparing the relative timestamp of the current image uploaded by the image sensor with the recording timestamp of the current recording frame, therefore, the image to be recorded corresponding to the current recording frame can be determined according to the comparison results.

S30. Performing video recording according to the image to be recorded.

It should be noted that, when performing video recording according to the image to be recorded, the image to be recorded may be added to a video packaging assembly, the recording timestamp of the current recording frame may be deleted, and it may return to the step of taking a frame to be recorded with the smallest recording timestamp as the current recording frame. In order to avoid unlimited recording, in this embodiment, the recorded video may be generated by the video packaging assembly after receiving a recording stop instruction.

It can be understood that, since the current recording frame has been recorded after the image to be recorded is added to the video packaging assembly, the recording timestamp of the current recording frame can be deleted, and then the frame to be recorded with the smallest recording timestamp can be updated as the new current recording frame.

In the specific implementation, the recording stop instruction can be triggered by the user, that is, the user stops triggering through a human-computer interaction component such as a touch screen and a button to generate a recording stop instruction. Certainly, the recording stop instruction can also be generated by the Internet Protocol camera itself, that is, the Internet Protocol camera can generate the recording stop instruction according to conditions such as a current storage space size or a recording time length, which is not limited in this embodiment.

In this embodiment, a relative timestamp of a current image uploaded by an image sensor is compared with a recording timestamp of a current recording frame, then an image to be recorded corresponding to the current recording frame is determined according to a comparison result, and finally video recording is performed according to the image to be recorded. As can be seen, according to the technical solution of this disclosure, video recording will not be performed directly according to the image reported by the image sensor. The image to be recorded corresponding to the current recording frame is determined according to the comparison result between the relative timestamp of the current image uploaded by the image sensor and the recording timestamp of the current recording frame, and then video recording is performed according to the image to be recorded. As a result, the relative timestamp of the image to be recorded can be made closer to the recording timestamp of the current recording frame, so that the frame rate of the recorded video is stable, and the smoothness of video playback is ensured.

Figure 3:
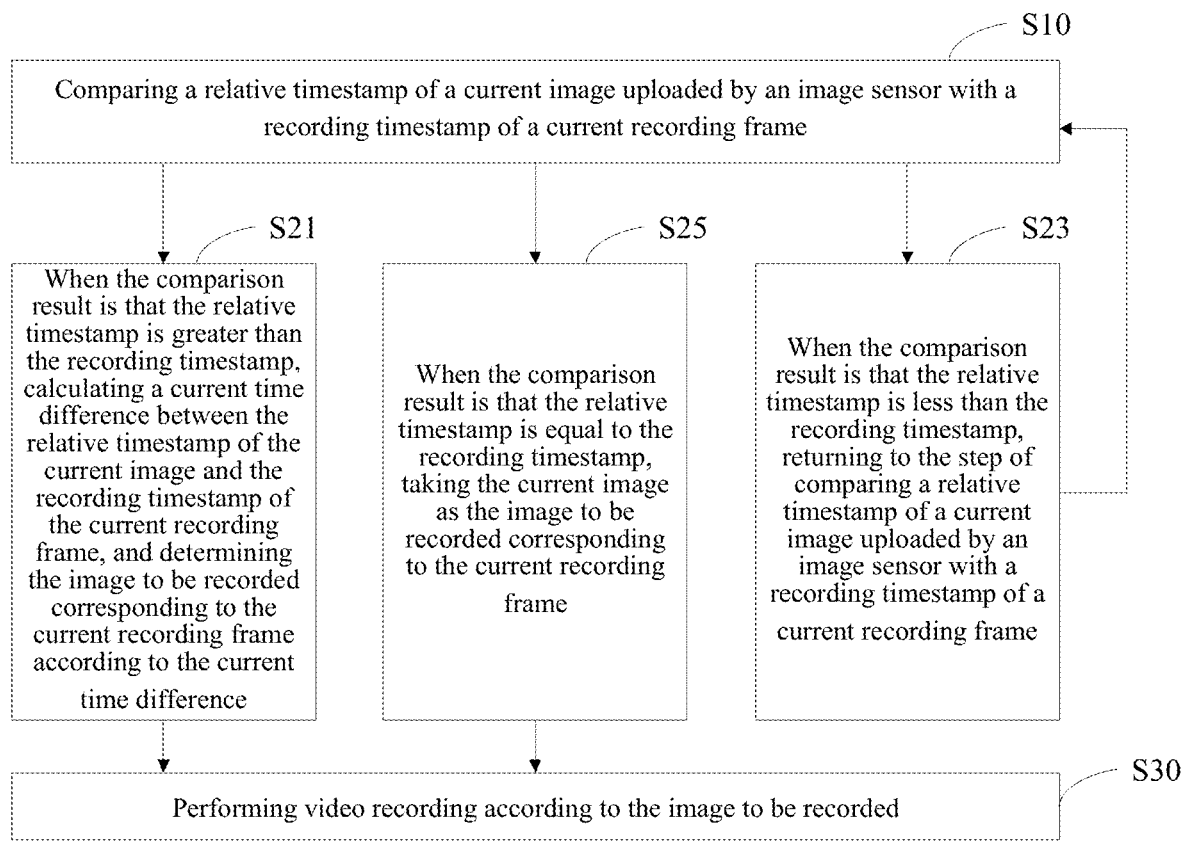
FIG. 3 is a flow chart of a second embodiment of the video recording method according to this disclosure.

Referring to FIG. 3, FIG. 3 is a flow chart of a second embodiment of the video recording method according to this disclosure. Based on the embodiment shown in FIG. 2, a second embodiment of the video recording method according to this disclosure is provided.

In the second embodiment, step S20 specifically includes:

S21. In a determination that the comparison result is that the relative timestamp is greater than the recording timestamp, calculating a current time difference between the relative timestamp of the current image and the recording timestamp of the current recording frame, and determining the image to be recorded corresponding to the current recording frame according to the current time difference.

It should be noted that although the relative timestamp is greater than the recording timestamp, the current time difference between the relative timestamp of the current image and the recording timestamp of the current recording frame may also be large. Therefore, it is necessary to determine the image to be recorded corresponding to the current recording frame according to the current time difference.

When determining the image to be recorded corresponding to the current recording frame according to the current time difference, in a determination that the current time difference is less than a preset time difference, taking the current image as the image to be recorded corresponding to the current recording frame, where the preset time difference is a time difference between the recording timestamp and a relative timestamp stored in a preset area; in a determination that the current time difference is greater than the preset time difference, taking an image in the preset area as the image to be recorded corresponding to the current recording frame; and in a determination that the current time difference is equal to the preset time difference, since a time difference between the image in the preset area and the current recording frame is the same as a time difference between the current image from the current recording frame, so, the image in the preset area or the current image is taken as the image to be recorded corresponding to the current recording frame.

It can be understood that the relative timestamp of the previous image uploaded by the image sensor and the previous image are usually stored in the preset area. Therefore, when the current time difference is less than the preset time difference, the relative timestamp of the current image is closer to the recording timestamp of the current recording frame, so the current image is taken as the image to be recorded corresponding to the current recording frame; and when the current time difference is greater than the preset time difference, the relative timestamp of the image in the preset area is closer to the recording timestamp of the current recording frame, so the image in the preset area is taken as the image to be recorded corresponding to the current recording frame.

In a specific implementation, in order to ensure the timeliness of data in the preset area, in this embodiment, in a determination that the current time difference is less than the preset time difference, the current image is taken as the image to be recorded corresponding to the current recording frame, and data is updated for the preset area according to the current image and the relative timestamp of the current image.

It should be noted that, updating data for the preset area according to the current image and the relative timestamp of the current image can be understood as: replacing original stored data in the preset area with the relative timestamp of the current image and the current image.

S23. In a determination that the comparison result is that the relative timestamp is less than the recording timestamp, returning to the step of comparing a relative timestamp of a current image uploaded by an image sensor with a recording timestamp of a current recording frame.

It can be understood that since the relative timestamp is smaller than the recording timestamp, the relative timestamp of the image uploaded later by the image sensor may be closer to the recording timestamp of the current recording frame. Therefore, it is necessary to return to the step of comparing the relative timestamp of the current image uploaded by the image sensor with the recording timestamp of the current recording frame. The current image is the image uploaded by the image sensor at the current time, while the current time has changed after returning to the step of comparing the relative timestamp of the current image uploaded by the image sensor with the recording timestamp of the current recording frame, therefore, the image sensor may upload the next frame image already, and the subsequent comparison process may be continued by taking the uploaded next frame image as a new current image.

In a specific implementation, in order to ensure the timeliness of data in the preset area, in this embodiment, in a determination that the comparison result is that the relative timestamp is less than the recording timestamp, updating data for the preset area according to the current image and the relative timestamp of the current image, returning to the step of comparing a relative timestamp of a current image uploaded by an image sensor with a recording timestamp of a current recording frame.

S25. In a determination that the comparison result is that the relative timestamp is equal to the recording timestamp, taking the current image as the image to be recorded corresponding to the current recording frame.

It should be noted that when the relative timestamp is equal to the recording timestamp, at this time, the relative timestamp of the current image must be the closest to the recording timestamp of the current recording frame. Therefore, the current image is directly taken as the image to be recorded corresponding to the current recording frame.

In a specific implementation, in order to ensure the timeliness of data in the preset area, in this embodiment, in a determination that the comparison result is that the relative timestamp is equal to the recording timestamp, taking the current image as the image to be recorded corresponding to the current recording frame, and updating data for the preset area according to the current image and the relative timestamp of the current image.

This embodiment will be described below with a specific example, but the protection scope of this disclosure is not limited.

When the video recording instruction is received, a timestamp T_ori is added to each image in the image sensor to mark the timestamp of the original point of each image. The timestamp T_ori of a first image uploaded by the image sensor may be taken as the reference timestamp T_base.

When recording video, in order to ensure the stability of the frame rate, it is necessary to ensure that the timestamp of each frame of image is uniform, and the number of frames per second meets the requirements. Taking the preset frame rate FPS of 30 as an example, for images filled into the video packaging assembly MediaMuxer for recording, the time interval between two frames should be 33.33 ms, and 30 frames of data should be filled every second.

The recording timestamp for the frame to be filled into the MediaMuxer is T_real, and a variable "framecount" is added to count the number of frames that have been filled into the MediaMuxer. The latest acquired image is marked with pre_image.

When receiving the first frame image uploaded by the image sensor, the first frame image can be added to the MediaMuxer, the timestamp is set to 0, "framecount" is updated by adding 1, the first frame image is set to pre_image, and the timestamp 0 is assigned to T_pre.

For the received current image uploaded by the image sensor, the timestamp T_ori is first parsed and subtracted with T_base to obtain the relative timestamp T_current=T_ori−T_base. Since the next current recording frame is the second frame, the recording timestamp is T_next=33.33 ms, namely, 33.33*framecount, T_current needs to be compared with T_next, and the comparison is as follows.

The first case: T_current is less than T_next; at this time, T_current can be assigned to T_pre for marking, the current image can be assigned to pre_image, the recording operation is not performed, "framecount" is not updated, the next frame image uploaded by the image sensor is waited and taken as the new current image, and the above comparison process is performed on the new current image.

The second case: T_current is greater than T_next; at this time, (T_current−T_next) may be compared with (T_next−T_pre), and the image to be recorded corresponding to the current recording frame may be determined according to the comparison result as follows.

Comparison result 1: (T_current−T_next) is less than (T_next−T_pre), it means that the relative timestamp of the current image is closer to the recording timestamp of the frame to be recorded. At this time, the current image can be filled in the MediaMuxer, the recording timestamp T_real=33.33*framecount is set, "framecount" is updated by adding 1, the current image is set to pre_image, T_current is assigned to T_pre, the next frame image uploaded by the image sensor is waited and taken as the new current image, and the above-mentioned comparison process is performed on the new current image.

Comparison result 2: (T_current−T_next) is greater than (T_next−T_pre), it means that the image in the preset area is closer to the recording timestamp of the frame to be recorded. At this time, the image in the preset area can be filled into the MediaMuxer, the recording timestamp T_real=33.33*framecount is set, "framecount" is updated by adding 1, the pre_image is kept unchanged, T_pre is kept unchanged, the next frame image uploaded by the image sensor is waited and taken as the new current image, and the above-mentioned comparison process is performed on the new current image.

Comparison result 3: (T_current−T_next) is equal to (T_next−T_pre), it means that the image in the preset area and the current image are close to the recording timestamp of the frame to be recorded to the same extent. At this time, the image in the preset area or the current image can be filled into the MediaMuxer.

When filling the image in the preset area into the MediaMuxer, it can be processed according to the comparison result 2, that is, the recording timestamp T_real=33.33*framecount is set, "framecount" is updated by adding 1, pre_image is kept unchanged, T_pre is kept unchanged, the next frame image uploaded by the image sensor is waited and taken as the new current image, and the above-mentioned comparison process is performed on the new current image.

When filling the current image into the MediaMuxer, it can be processed according to the comparison result 1, that is, the recording timestamp T_real=33.33*framecount is set, "framecount" is updated by adding 1, the current image is set to pre_image, T_current is assigned to T_pre, the next frame image uploaded by the image sensor is waited and taken as the new current image, and the above-mentioned comparison process is performed on the new current image.

The third case: T_current is equal to T_next; at this time, the current image can be filled in the MediaMuxer, the recording timestamp T_real=33.33*framecount is set, "framecount" is updated by adding 1, the current image is set to pre_image, T_current is assigned to T_pre, the next frame image uploaded by the image sensor is waited and taken as the new current image, and the above-mentioned comparison process is performed on the new current image.

It should be noted that the relative timestamp can be taken as the judgment basis to perform a frame loss operation (corresponding to the above comparison result 1) when the images are reported too dense, and perform a frame insertion operation (corresponding to the above comparison result 2) when an image is lost. The recording timestamp of the frame to be recorded can be set to a fixed increment step, which not only ensures the stability of the timestamp, but also meets the requirements of frame rate, so as to make the recorded video play more smoothly.

Figure 4:
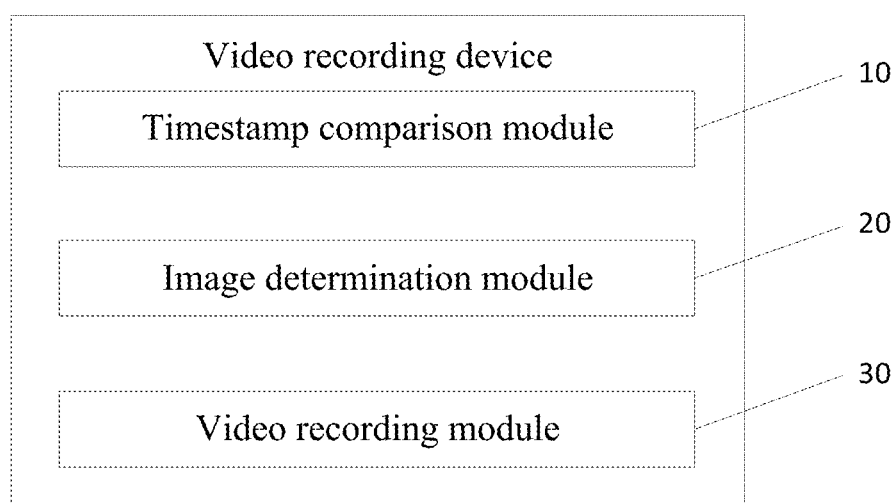
FIG. 4 is a block diagram of a first embodiment of a video recording device according to this disclosure.

Further, an embodiment of this disclosure further provides a video recording device, referring to FIG. 4, the video recording device includes:

a timestamp comparison module 10 configured for comparing a relative timestamp of a current image uploaded by an image sensor with a recording timestamp of a current recording frame;

an image determination module 20 configured for determining an image to be recorded corresponding to the current recording frame according to a comparison result; and a video recording module 30 configured for performing video recording according to the image to be recorded.

Each module in the above device can be configured to implement each step in the above method, and details are not described herein.

Further, an embodiment of this disclosure further provides a storage medium, the storage medium is stored with a video recording program, the video recording program is executed by the processor to achieve the following operations:

comparing a relative timestamp of a current image uploaded by an image sensor with a recording timestamp of a current recording frame;

determining an image to be recorded corresponding to the current recording frame according to a comparison result; and performing video recording according to the image to be recorded.

Further, the video recording program is executed by the processor to further implement the following operations:

in a determination that the comparison result is that the relative timestamp is greater than the recording timestamp, calculating a current time difference between the relative timestamp of the current image and the recording timestamp of the current recording frame, and determining the image to be recorded corresponding to the current recording frame according to the current time difference;

in a determination that the comparison result is that the relative timestamp is less than the recording timestamp, returning to the step of comparing a relative timestamp of a current image uploaded by an image sensor with a recording timestamp of a current recording frame; and in a determination that the comparison result is that the relative timestamp is equal to the recording timestamp, taking the current image as the image to be recorded corresponding to the current recording frame.

Further, the video recording program is executed by the processor to further implement the following operations:

in a determination that the current time difference is less than a preset time difference, taking the current image as the image to be recorded corresponding to the current recording frame, where the preset time difference is a time difference between the recording timestamp and a relative timestamp stored in a preset area;

in a determination that the current time difference is greater than the preset time difference, taking an image in the preset area as the image to be recorded corresponding to the current recording frame; and in a determination that the current time difference is equal to the preset time difference, taking the image in the preset area or the current image as the image to be recorded corresponding to the current recording frame.

Further, the video recording program is executed by the processor to further implement the following operations:

in a determination that the comparison result is that the relative timestamp is less than the recording timestamp, updating data for the preset area according to the current image and the relative timestamp of the current image, returning to the step of comparing a relative timestamp of a current image uploaded by an image sensor with a recording timestamp of a current recording frame;

in a determination that the comparison result is that the relative timestamp is equal to the recording timestamp, taking the current image as the image to be recorded corresponding to the current recording frame, and updating data for the preset area according to the current image and the relative timestamp of the current image; and in a determination that the current time difference is less than the preset time difference, taking the current image as the image to be recorded corresponding to the current recording frame, and updating data for the preset area according to the current image and the relative timestamp of the current image.

Further, the video recording program is executed by the processor to further implement the following operations:

determining a recording timestamp of each frame to be recorded according to a preset frame rate; and taking a frame to be recorded with the smallest recording timestamp as the current recording frame; and adding the image to be recorded to a video packaging assembly, deleting the recording timestamp of the current recording frame, and returning to the step of taking a frame to be recorded with the smallest recording timestamp as the current recording frame.

Further, the video recording program is executed by the processor to further implement the following operations:

upon receiving a timestamp of the current image uploaded by the image sensor, converting the timestamp of the current image to the relative timestamp according to a reference timestamp.

Further, the video recording program is executed by the processor to further implement the following operations:

upon receiving a video recording instruction, taking a timestamp of a first image uploaded by the image sensor as the reference timestamp.

In this embodiment, a relative timestamp of a current image uploaded by an image sensor is compared with a recording timestamp of a current recording frame, then an image to be recorded corresponding to the current recording frame is determined according to a comparison result, and finally video recording is performed according to the image to be recorded. As can be seen, according to the technical solution of this disclosure, video recording will not be performed directly according to the image reported by the image sensor. The image to be recorded corresponding to the current recording frame is determined according to the comparison result between the relative timestamp of the current image uploaded by the image sensor and the recording timestamp of the current recording frame, and then video recording is performed according to the image to be recorded. As a result, the relative timestamp of the image to be recorded can be made closer to the recording timestamp of the current recording frame, so that the frame rate of the recorded video is stable, and the smoothness of video playback is ensured.

It should be noted that in this article, the terms "comprise", "include" or any other variant thereof are intended to cover non-exclusive inclusion, so that a process, method, article or system that includes a series of elements includes not only those elements, but also other elements that are not explicitly listed, or include elements inherent to this process, method, article, or system. Without more restrictions, the element defined by the sentence "comprise a . . . " does not exclude that there are other identical elements in the process, method, article or system that includes the element.

The sequence numbers of the above embodiments of this disclosure are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is better. Based on this understanding, the technical solution of this disclosure can be embodied in the form of a software product in essence or part that contributes to the prior art, and the computer software product is stored in a storage medium (such as ROM/RAM, magnetic disk, optical disk as described above), including several instructions to make a terminal apparatus (which can be a mobile phone, computer, server, controlled terminal, or network equipment, etc.) to implement the method described in each embodiment of this disclosure.

The above are only preferred embodiments of the present disclosure and do not limit the patent scope of the present disclosure. Any equivalent structure or equivalent process transformation made by the description and drawings of the present disclosure, or directly or indirectly used in other related technical fields are similarly included in the patent protection scope of the present disclosure.

What is claimed is:

1. A video recording method, comprising the following steps:

comparing a relative timestamp of a current image uploaded by an image sensor with a recording timestamp of a current recording frame;

determining an image to be recorded corresponding to the current recording frame according to a comparison result; and performing video recording according to the image to be recorded.

2. The video recording method of claim 1, wherein the step of determining an image to be recorded corresponding to the current recording frame according to a comparison result comprises:
  in a determination that the comparison result is that the relative timestamp is greater than the recording timestamp, calculating a current time difference between the relative timestamp of the current image and the recording timestamp of the current recording frame, and determining the image to be recorded corresponding to the current recording frame according to the current time difference;
  in a determination that the comparison result is that the relative timestamp is less than the recording timestamp, returning to the step of comparing a relative timestamp of a current image uploaded by an image sensor with a recording timestamp of a current recording frame; and
  in a determination that the comparison result is that the relative timestamp is equal to the recording timestamp, taking the current image as the image to be recorded corresponding to the current recording frame.

3. The video recording method of claim 2, wherein the step of determining the image to be recorded corresponding to the current recording frame according to the current time difference comprises:
  in a determination that the current time difference is less than a preset time difference, taking the current image as the image to be recorded corresponding to the current recording frame, wherein the preset time difference is a time difference between the recording timestamp and a relative timestamp stored in a preset area;
  in a determination that the current time difference is greater than the preset time difference, taking an image in the preset area as the image to be recorded corresponding to the current recording frame; and
  in a determination that the current time difference is equal to the preset time difference, taking the image in the preset area or the current image as the image to be recorded corresponding to the current recording frame.

4. The video recording method of claim 3, wherein:
  the step of in a determination that the comparison result is that the relative timestamp is less than the recording timestamp, returning to the step of comparing a relative timestamp of a current image uploaded by an image sensor with a recording timestamp of a current recording frame comprises:
    in a determination that the comparison result is that the relative timestamp is less than the recording timestamp, updating data for the preset area according to the current image and the relative timestamp of the current image, returning to the step of comparing a relative timestamp of a current image uploaded by an image sensor with a recording timestamp of a current recording frame;
  the step of in a determination that the comparison result is that the relative timestamp is equal to the recording timestamp, taking the current image as the image to be recorded corresponding to the current recording frame comprises:
    in a determination that the comparison result is that the relative timestamp is equal to the recording timestamp, taking the current image as the image to be recorded corresponding to the current recording frame, and updating data for the preset area according to the current image and the relative timestamp of the current image; and
  the step of in a determination that the current time difference is less than a preset time difference, taking the current image as the image to be recorded corresponding to the current recording frame comprises:
    in a determination that the current time difference is less than the preset time difference, taking the current image as the image to be recorded corresponding to the current recording frame, and updating data for the preset area according to the current image and the relative timestamp of the current image.

5. The video recording method of claim 1, wherein before the step of comparing a relative timestamp of a current image uploaded by an image sensor with a recording timestamp of a current recording frame, the video recording method further comprises:
  determining a recording timestamp of each frame to be recorded according to a preset frame rate; and
  taking a frame to be recorded with the smallest recording timestamp as the current recording frame;
  wherein the step of performing video recording according to the image to be recorded comprises:
    adding the image to be recorded to a video packaging assembly, deleting the recording timestamp of the current recording frame, and returning to the step of taking a frame to be recorded with the smallest recording timestamp as the current recording frame.

6. The video recording method of claim 2, wherein before the step of comparing a relative timestamp of a current image uploaded by an image sensor with a recording timestamp of a current recording frame, the video recording method further comprises:
  determining a recording timestamp of each frame to be recorded according to a preset frame rate; and
  taking a frame to be recorded with the smallest recording timestamp as the current recording frame;
  wherein the step of performing video recording according to the image to be recorded comprises:
    adding the image to be recorded to a video packaging assembly, deleting the recording timestamp of the current recording frame, and returning to the step of taking a frame to be recorded with the smallest recording timestamp as the current recording frame.

7. The video recording method of claim 3, wherein before the step of comparing a relative timestamp of a current image uploaded by an image sensor with a recording timestamp of a current recording frame, the video recording method further comprises:
  determining a recording timestamp of each frame to be recorded according to a preset frame rate; and
  taking a frame to be recorded with the smallest recording timestamp as the current recording frame;
  wherein the step of performing video recording according to the image to be recorded comprises:
    adding the image to be recorded to a video packaging assembly, deleting the recording timestamp of the current recording frame, and returning to the step of taking a frame to be recorded with the smallest recording timestamp as the current recording frame.

8. The video recording method of claim 4, wherein before the step of comparing a relative timestamp of a current image uploaded by an image sensor with a recording timestamp of a current recording frame, the video recording method further comprises:

determining a recording timestamp of each frame to be recorded according to a preset frame rate; and taking a frame to be recorded with the smallest recording timestamp as the current recording frame;

wherein the step of performing video recording according to the image to be recorded comprises:

adding the image to be recorded to a video packaging assembly, deleting the recording timestamp of the current recording frame, and returning to the step of taking a frame to be recorded with the smallest recording timestamp as the current recording frame.

9. The video recording method of claim 1, wherein before the step of comparing a relative timestamp of a current image uploaded by an image sensor with a recording timestamp of a current recording frame, the video recording method further comprises:

upon receiving a timestamp of the current image uploaded by the image sensor, converting the timestamp of the current image to the relative timestamp according to a reference timestamp.

10. The video recording method of claim 2, wherein before the step of comparing a relative timestamp of a current image uploaded by an image sensor with a recording timestamp of a current recording frame, the video recording method further comprises:

upon receiving a timestamp of the current image uploaded by the image sensor, converting the timestamp of the current image to the relative timestamp according to a reference timestamp.

11. The video recording method of claim 3, wherein before the step of comparing a relative timestamp of a current image uploaded by an image sensor with a recording timestamp of a current recording frame, the video recording method further comprises:

upon receiving a timestamp of the current image uploaded by the image sensor, converting the timestamp of the current image to the relative timestamp according to a reference timestamp.

12. The video recording method of claim 4, wherein before the step of comparing a relative timestamp of a current image uploaded by an image sensor with a recording timestamp of a current recording frame, the video recording method further comprises:

upon receiving a timestamp of the current image uploaded by the image sensor, converting the timestamp of the current image to the relative timestamp according to a reference timestamp.

13. The video recording method of claim 9, wherein before the step of upon receiving a timestamp of the current image uploaded by the image sensor, converting the timestamp of the current image to the relative timestamp according to a reference timestamp, the video recording method further comprises:

upon receiving a video recording instruction, taking a timestamp of a first image uploaded by the image sensor as the reference timestamp.

14. An Internet Protocol camera, comprising: a memory, a processor, and a video recording program stored on the memory and executable on the processor, wherein the video recording program is executed by the processor to implement the steps of the video recording method as recited claim 1.

15. A non-volatile storage medium, wherein a video recording program is stored on the non-volatile storage medium, and the video recording program is executed by a processor to implement the steps of the video recording method as recited claim 1.

* * * * *